United States Patent
Chen et al.

(10) Patent No.: US 7,317,052 B2
(45) Date of Patent: *Jan. 8, 2008

(54) FLUOROPOLYMER BLEND WITH HIGH IONIC CONDUCTIVITY

(75) Inventors: Jen-Luan Chen, Hsinchu (TW);
Jhi-Hsien Huang, Hsinchu (TW);
Wen-Liang Liu, Hsinchu (TW);
Chih-Yang Yeh, Hsinchu (TW);
Tsung-Lung Yang, Hsinchu (TW);
Lon-Cheng Cheng, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 10/997,850

(22) Filed: Nov. 29, 2004

(65) Prior Publication Data

US 2005/0154126 A1    Jul. 14, 2005

Related U.S. Application Data

(63) Continuation-in-part of application No. 10/085,103, filed on Mar. 1, 2002, now abandoned.

(51) Int. Cl.
*C08L 51/00* (2006.01)

(52) U.S. Cl. .................................................. 525/72
(58) Field of Classification Search ................. 525/72
See application file for complete search history.

(56) References Cited

U.S. PATENT DOCUMENTS

| 2003/0166773 A1* | 9/2003 | Chen et al. .................. 525/70 |
| 2004/0126638 A1* | 7/2004 | Chen et al. .................. 429/33 |
| 2005/0181255 A1* | 8/2005 | Chen et al. .................. 429/33 |

* cited by examiner

*Primary Examiner*—Jeffrey Mullis
(74) *Attorney, Agent, or Firm*—Troxell Law Office, PLLC

(57) ABSTRACT

A fluoropolymer blend with high ionic conductivity that can be applied in electroactive polymer composite includes following components: PVDF-g-SPS (styrene-grafted and sulfonated PVDF); PVDF; and hydrocarbon- or fluoro-elastomer. PVDF-g-PS(styrene-grafted PVDF) □ PVDF and hydrocarbon- or fluoro-elastomer are mixed with specific proportion and being dissolved in an aprotic solvent □ the solution is then cast film on a substrate followed by sulfonation to give the aforementioned compound membrane. The obtained compound membrane has excellent properties, such as thermal stability, acid-alkali resistance, good mechanical performance, excellent flexibility, and capability for processing appropriate cross-link for further enhancing the mechanical performance of this membrane.

13 Claims, No Drawings

FLUOROPOLYMER BLEND WITH HIGH IONIC CONDUCTIVITY

RELATED APPLICATIONS

This application is a Continuation In Part of application Ser. No. 10/085,103 (Pub. No. 2003/0166773 A1) filed on Mar. 1, 2002 now abandoned.

FIELD OF THE INVENTION

The object of the invention is to provide a fluoropolymer blend with high ionic conductivity, more particularly, which is applicable to an electroactive polymer composite (EAPC) membrane, and the membrane has the merits of excellent thermal resistance, acid-alkali resistance, mechanical strength, curvature, and flexibility, etc.

BACKGROUND OF THE INVENTION

Following the high-level progress of requirement, the common 3C video photoelectric products (computer, communication, and consuming electron) are expected to continue to become the star industry for Taiwan after she entering the $21^{st}$ century. The market requirement shows that the product specifications for monitor, laptop computer, desktop computer, cellular phone, and other data storage device have already developed gradually toward the trends of lightness, thinness, shortness, smallness, and multifunction. These trends are expected to be widened to all the 3C video products. For the plastic pieces of thin shape, especially for the outer shell, the requirement for the characteristics of resistance to sound, vibration, heat, and electromagnetic waves has become a necessity and urgency. Nowadays, because of the limitation of materials, the actuator of optical, thermal, and electric mechanisms can not fulfill the requirement of next generation for extra-lightness, -thinness, -shortness, -smallness, and low energy consumption. The revolutionary EAPC of intelligent composite has the merits of lightness, elasticity, low power consumption, long life cycle, and quick reaction, etc. and is the optimal choice for a brand new actuator. The actuators, manufactured by this material, such as: micro pump, optical switch, gripper, fan, optical-valve, lens controller, focus lens, micromirror, and active noise controller, etc. may be applied in the products of machine, micro device, 3C component assembly, photoelectric device and other artificial muscle for medical treatment and people livelihood. In tradition, the most typical ionic polymer for EAPC intelligent composite is Nafion. A membrane made by this material has the cluster of hydrophile property, and this cluster is connected by narrow ionic passage, and by which water or ion is transferred quickly. However, the passage is easily destroyed to interrupt the transfer due to the dehydration of the material, besides the price of the material is extremely expansive, its coming source is not easy to handle, and the manufacture of this material is further very complicated.

In order to further apply this kind of material in increasingly precise and miniature electronic products, the research of this field made by more and more people has shown that there are still many shortcomings existed:

The U.S. Pat. No. 4,308,359 has disclosed an application of PVDF-g-SPS (styrene-grafted and sulfonated PVDF), but its property does not fulfill the requirement, so its application is limited.

In a compound method of PVDF-g-SPS mentioned in the literature of Electrochem Acta, 43, NoS, 12-13, p1881~p1890, a PDVF membrane is irradiated under 175 KV, 100 kGy, then immersed in styrene solution to give grafted product, this product is sulfonated to give PVDF-g-SPS. Its product may be applied in conduction membrane of hydrogen ion or fuel cell, but it is still necessary to enhance its effect.

In the literature of Materials Research Society Symposium Proceeding Vol. 600, P267, 2000, Materials Research Society, a test piece made by polyvinyl acetate applies Au as an electrode, but it still has the shortcoming of easy break during swinging.

In the literature of Materials Research Society Symposium Proceeding Vol. 600, P229, 2000, Materials Research Society, a macromolecule electrolyte membrane of Nafion or Flemion with perfluorinated structure applies Au as an electrode. The membrane may be deflected under the driving of low voltage, but its application field is still too narrow, and it is uneasy for changing property and mass production. Besides, the price is expensive and the limitation of its coming source is further a serious problem that harasses the relative business.

In the U.S. Pat. No. 5,403,675, a macromolecular with the rigid-rod of polyphenyl is sulphonated to make PEM to replace Nafion for reducing price and still keep excellent conductivity. But, the shortcomings of such kind of molecule are its solubility to water is too large during high ionization, the conductivity is worsened during low ionization, and the stability is poor.

In the U.S. Pat. No. 5,795,496, a sulphonated PEEK replaced the Nafion is made as dense surface membrane for reducing the penetration rate of methanol and is applied in the fuel cell. Its shortcomings are that the solubility to water is great for the S-PEEK and the conductivity of the membrane is lowered when the ionization of the dense surface membrane is reduced.

From above description, the relative business still has to develop a conductive membrane that has excellent characteristics and competition to drive macromolecular composite electrically for reaching the requirements of high mechanical strength, high conductivity and high stability.

SUMMARY OF THE INVENTION

The object of the invention is to provide a fluoropolymer blend with high ionic conductivity that may be applied in an electroactive polymer composite (EAPC). The membrane has the characteristics of excellent thermal-resistance, acid-alkali resistance, mechanical strength, curvature, and flexibility, etc., and also has the tensile strength over 250 kg/cm².

Another object of the invention is to provide a fluoropolymer blend with high ionic conductivity that may be applied in an electroactive polymer composite (EAPC) membrane. The membrane has excellent mechanical performance and may also be cross-linked under the alkaline circumstance of diamine or peroxide for further enhancing its mechanical performance.

Further object of the invention is to provide a fluoropolymer blend with high ionic conductivity that is comprised of PVDF-g-SPS (styrene-grafted and sulfonated PVDF), PVDF (poly[vinylidene fluoride]), and fluoro- or hydrocarbon-elastomer. The compound membrane may get appropriate mechanical performance and flexibility by proportional adjustment of above components.

In order to achieve above objects, the invention particularly provides a fluoropolymer blend with high ionic conductivity that may be applied in an electroactive polymer composite (EAPC) and mainly includes following components: PVDF-g-SPS, PVDF, and hydrocarbon- or fluoro-elastomer. The invention is a blend assembled by these three components, that is, PVDF-g-SPS, hydrocarbon- or fluoro-elastomer, and PVDF. After mixing the PVDF-g-PS, hydrocarbon- or fluoro-elastomer, and PVDF with specific proportion and dissolving them in an oily or non-oily solvent of non-proton or proton of high boiling point, the solution is coated on a substrate and is heated to get rid of the solvent afterwards to get a compound membrane. Then, a compound membrane of PVDF-g-SPS may be obtained by sulphonating the aforementioned compound membrane. The obtained compound membrane has excellent properties, such as thermal stability, acid-alkali resistance, good mechanical performance, excellent flexibility, and capability for processing appropriate cross-link for further enhancing the mechanical performance of this membrane.

In addition, there is another characteristic for the compound membrane of PVDF-g-SPS according to the invention. That is, the degree of grafting (defined as :d.o.g=$[(m_1-m_0)/m_0] \times 100\%$, where $m_0$ is the mass of PVDF, and $m_1$ is the mass of grafted PVDF) of the PVDF-g-PS in the process may be adjusted at random, and after it being sulfonated, different ionic group content of PVDF-g-SPS may be obtained. The properties of chemical resistance and mechanical performance of the PVDF-g-SPS of high ionization rate can also be enhanced because of adding the hydrocarbon- or fluoro-elastomer, while the increase of adding proportion of hydrocarbon- or fluoro-elastomer may also raise the flexibility of the compound membrane appropriately. Therefore, the compound membrane of PVDF-g-SPS according to the invention may fulfill the functions that can not be obtained by prior arts, that is, its mechanical strength or flexibility can be raised according to the necessity, or both can be fulfilled as requirement at the same time.

DETAILED DESCRIPTION OF THE PREFERRED EMBODIMENT

The process of the compound membrane blend of fluoropolymer with high ionic conductivity is to contain the sulfonic acid group as the main component for the PVDF-g-SPS. First, the process flow path of the PVDF is to graft the styrene monomer onto the PVDF to become the PVDF-g-PS by the applications of x-ray, electron beam, y-ray or plasma method. However, appropriate degree of grafting (defined as :d.o.g =$[(m_1-m_0)/m_0] \times 100\%$, where m0 is the mass of PVDF, and m1 is the mass of grafted PVDF) may make the resin keep its original mechanical performance and keep appropriate solubility in solution to facilitate following reaction or working procedures. In order to reach the appropriate degree of grafting, we may control the amount of monomer usage, kind of irradiator, and time of irradiation to change its degree of grafting as requirement. Then, the PVDF-g-SPS can be obtained by sulphonating the PVDF-g-PS with sulfphonating reagents, such as strong sulfuric acid, chlorosulfonic acid or flaming sulfuric acid, etc.

As a general rule, several factors may influence the properties of the resin:

(a) During low degree of grafting, although the mechanical property of the thin membrane made by solvent method is better, but the containment of sulfonic acid group is low and water uptake ratio (defined as :d.o.g= $[(m_s-m_d)/m_d] \times 100\%$, where $m_s$ is the mass of swelling membrane, and $m_d$ is the mass of dry membrane) is also low, so its ionic conductivity is worse.

(b) When the degree of grafting of the styrene is higher than 45%, the containment of sulfonic acid group is increased to make better ionic conductivity. But, the membrane formation is become worse, neither is the mechanical property to cause the thin membrane easy to break, so its application is limited greatly.

(c) The membrane made by the PVDF-g-SPS only is difficult for applying in an electroactive polymer (EAP) material. Although its ionic conductivity and mechanical strength may reach the requirement, but its hardness is too great to get a good flexibility, so even swollen by water, the membrane still can not be driven by external electric voltage due to too great rigidity.

Above-mentioned shortcomings can all be improved by the technique disclosed by the invention, which is a blend assembled by three components, that is, PVDF-g-PS, hydrocarbon- or fluoro-elastomer, and PVDF. After mixing the PVDF-g-SPS, hydrocarbon- or fluoro-elastomer, and PVDF with specific proportion and dissolving them in an oily non-proton solvent with high boiling point, the obtained solution is then coated on a substrate and is heated to get rid of the solvent to get a compound membrane. A desired compound membrane of PVDF-g-SPS can be obtained by sulphonating the compound membrane by aforementioned sulphonating method. The obtained compound membrane of PVDF-g-SPS has following excellent properties:

(a) Excellent thermal stability: this compound material of thin membrane is extremely stable in the atmosphere below 200 degrees Celsius and is only started to decompose gradually above 250 degrees Celsius, and the 50% decomposing temperature according to TGA is 345 degrees Celsius.

(b) Acid-alkali resistance: this compound material of this membrane is still not decomposed even stored long time in the solution with PH range of 1 to 14.

(c) Excellent mechanical performance: its tensile strength may exceed 250 kg/cm$^2$.

(d) Excellent flexibility.

(e) The mechanical performance and thermal resistance of this membrane may also be further enhanced by proceeding appropriate cross-linking process under the existence of alkaline compound by using the diamine or peroxide.

Besides above-mentioned advantages, another characteristic of the compound membrane of PVDF-g-SPS according to the invention is that the degree of grafting of the PVDF-g-PS can be adjusted at random, and after it being sulfonated, different ionic group content of PVDF-g-SPS may be obtained. The properties of chemical resistance and mechanical performance of the PVDF-g-SPS of high ionic group content can also be enhanced because of adding the hydrocarbon- or fluoro-elastomer, while the increase of adding proportion of hydrocarbon- or fluoro-elastomer may also raise the flexibility of the compound membrane appropriately. Therefore, the compound membrane of PVDF-g-SPS according to the invention may fulfill the functions that can not be obtained by prior arts, that is, its mechanical strength or flexibility can be raised according to the necessity, or both can be fulfilled as requirement at the same time.

The number average molecular weight(Mn) of the PVDF resin powder applied in manufacturing the PVDF-g-PS according to the invention is preferably between 80,000 and 350,000 and the best one is between 120,000 and 230,000. The resin of such molecular weight has excellent mechanical performance also has good properties of chemical resistance, and thermal resistance. The graft reaction of styrene monomer is proceeded by the irradiation of y-ray, electron beam, x-ray or plasma method. Its degree of grafting is preferably between 10% to 100%, but the best one is between 30% and 65%. The control of this grafting degree may be determined by the dosage of radiative irradiation, irradiation time, and the concentration of the monomer. The appropriate graft following the procedure of ionization may introduce the desired sulfonic acid group that is served as the main source of water absorption for the membrane, also is provided as the main passage of transfer inside the membrane for the ions and water. The resin powder may be ionized directly after being grafted, or ionized after the formation of a membrane by the solvent method. In general ionization method, it applies strong sulfuric acid, flaming sulfuric acid, or chlorosulfonic acid, while the reaction time is determined by the particle diameter, membrane thickness, acid reagent concentration, reaction temperature, and sulphonation rate, etc. As a general rule, the reaction can be completed within three hours at room temperature. The degree of sulfonation may be determined by analyzing its containment of —$SO_3H$ group by the acid-alkali titration method, the degree of sulfonation is the percentage of sulfonated phenyl group. (ratio of sulfonated phenyl groups to total phenyl groups).

The hydrocarbon-elastomer described in the invention may be acrylic-elastomer, while the fluoro-elastomer may be Viton (copolymer of vinylidenefluoride/hexafluoropropylene from 3M Co.), the terpolymers of vinylidenefluoride/hexafluoropropylene/tetrafluoroethylene, or the mixture of above-mentioned hydrocarbon- and fluoro-elastomer or different fluoro-elastomers. Acrylic elastomer may be used in the place of the hydrocarbon elastomer described in the invention, and its number average molecular weight is preferably between 100,000 and 300,000, and the best one is between 150,000 and 250,000. The number average molecular weight of the fluoro-elastomer is preferably between 80,000 and 2,800,000, and the best one is between 100,000 and 200,000. The adding amount of above elastomers is 10~60% of the weight of the entire blend.

The solvent applied in dissolving above-mentioned PVDF, fluoro- or hydrocarbon-elastomer, and PVDF-g-PS is an aprotic solvent with high boiling point, such as: dimethylformamide, 1-methyl-2-pyrrolidone, dimethyl sulfoxide or the mixture thereof. In addition, small amount of protic solvent may be added in these solvents, and the preferable temperature for manufacturing the membrane with these solvents is between 20 degrees Celsius and 200 degrees Celsius, and the best one is between 60 degrees Celsius and 120 degrees Celsius. Besides the solvent method, any another well-known method for manufacturing the membrane may also be applied, such as: thermal press method, rolling-and-winding film method, or extruding method, etc.

Other interface activators may be added as assembling components for above-mentioned membrane, such as: the fluoro-surfactants of FC-430, FC-431, Fc-135, etc. of the 3M company, or the hydrocarbon surfactants of Allylalalcohol-1,2-batoxylate-block-ethoxylate, etc. of the Aldrich company. These surfactants may facilitate the sufficient and uniform combination among each polymer component to smoothen the membrane easily and are helpful to promote the properties of the membrane.

The materials of the invention have been developed through the molecular simulation and computational analysis by computer for researching the relationships among ionic group content, hydration, movement, and the molecular chemical structure, etc. These researches are beneficial to the molecular structure design for new fluoro-series ionic polymer or other characteristics. Further computational analyses may evaluate the feasibility and properties of the composition of key monomers and/or ionomer with different chemical structure.

To implement the content of the invention in more practical way, several preferable embodiments are presented as following for describing the content of the invention in more detail.

First Embodiment

First, the process for manufacturing the PVDF-g-SPS membrane: add a styrene monomer weighted 20~40 grams of 99.9% purity into the PVDF resin powder (average particle diameter is 0.25~0.40 μm and Mn≈200,000) weighted 30~70 grams, after being agitated, the mixture is irradiated with the intensity of 10~35kGy for proceeding the graft reaction. After being filtered, the graft copolymer thus obtained is extracted with acetic acid ethyl ester in a Soxhlet apparatus for 8 hours. The obtained solid product is white particle and weighted 60~100 grams, and its degree of grafting is 30~50% . Further, the PVDF-g-PS product has no decomposition phenomenon (TGA, 10 degrees Celsius/min) below 400 degrees Celsius. Furthermore, with the 1-methyl-2-pyrrolidone as solvent, add dry PVDF-g-PS weighted 2~5 grams, poly ethyl acrylate (Mn value is 190,000) weighted 4~8 grams, interface activator FC-431 weighted 0.1~0.5 g, and PVDF (Mn value is 200,000) weighted 5~9 grams into the 1-methyl-2-pyrrolidone solvent of 100~300 ml. These mixture is agitated continuously under the temperature of 60~90 degrees Celsius until all the components are dissolved. The solution is coated on a substrate to become a membrane of thickness of 30~50 μm under the temperature range of 80~100 degrees Celsius. Next, the membrane is sulfonated with the chlorosulfonic acid for one hour at room temperature under the circumstance of Nitrogen gas. After being taken out, the membrane is washed twice with ethyl acetate and then is gotten rid of residue acid by washing three times with deionized water and becomes an ionic membrane. Finally, the ionic membrane is dried for three hours in the temperature of 60~80 degrees Celsius to get a desired PVDF-g-SPS membrane.

Wherein, the thickness of the PVDF-g-SPS membrane is 40~70 μm, and its outer appearance shows as pale coffee color, and its properties are as follows. (a) Under the analysis rate of 10 degrees Celsius/min shown in TGA, this membrane has excellent thermal stability at the temperature below 200 degrees Celsius, and is gradually decomposed at the temperature above 250 degrees Celsius, while 50% of entire structure is decomposed at temperature of 345 degrees Celsius. (b) After being boiled in the boiling water for 30 minutes, the membrane is taken out from the water and wiped dry. Its water uptake is 20~30% by comparing the weights (water uptake=$[(m_s-m_d)/m_d]\times 100\%$, where $m_s$ is the mass of swelling membrane, and $m_d$ is the mass of dry membrane). (c) The conductivity of the membrane is 0.01 S/cm by testing with the method of alternating impedance.

Next, the metalation is under proceeding: immerse this membrane in water solution of 1N sodium hydroxide for 10~14 hours to transfer its inside sulfonic acid group into sodium sulfonate group, then again immerse this membrane into the salt solution containing the Pt or Au cations for 18~26 hours to make the Pt or Au cations permeate into the membrane and proceed interchange reaction with the sodium ions, finally a reducing reaction is proceeded by the reducer of anion to get the desired electrode. Wherein, the described reducer may be sodium borohydride or sodium sulfite.

This membrane may be driven under the electric current of 1~3 Volt and 0.1~1.0 Hz and the vibration amplitude may reach 11.5 mm in the electrolyte (electrode width is 3 mm and electrode length is 30 mm). Further, the vibration amplitude may reach 10 mm and the application time may also reach 1500 hr after being packaged by silicone polymer.

Second Embodiment

The manufacturing method for the PVDF-g-SPS according to this embodiment is similar to that of the first embodiment mostly. The difference is that a Diak#1 (Hexamethylene diamine dicarboxylate) weighted 0.1~0.3 grams and a $Pb_3O_4$ weighted 0.2~0.5 grams are added into the blend of PVDF-g-PS, poly ethyl acrylate, and PVDF resin. The membrane made by this solvent method is placed at temperature of 130 degrees Celsius ~170 degrees Celsius for 1~3 hours to generate several cross-links in portion among the PVDF resin, PVDF-g-PS, and poly ethyl acrylate. The membrane according to this embodiment has following characteristics: thickness is 40~60 μm, water uptake rate is 15~20%, while tensile strength may further reach the value of 300 $kg/cm^2$.

Table 1 is an experiment result comparison between the embodiments according to the invention with commonly known methods. From Table 1, the membrane made simply by PVDF-g-SPS according to prior arts obviously can not be driven with low voltage; also it is too weak, easily broken and unable to swing. Further, the membrane made simply by PVDF-g-SPS/PVDF is also unable to be driven by low voltage and unable to swing, although the mechanical performance of the membrane is enhanced, but its flexibility is poor. Therefore, they all can not be applied in EAPC.

However, the membrane composite made by the embodiment 5 to 7 according to the invention may be driven by low voltage and its thickness is thick enough to swing easily without breaking and its driving time is longer than that of Nafion.

In summary, the fluoropolymer blend with high ionic conductivity provided by the present invention may be applied in the electroactive polymer composite (EAPC). The invention applies the PVDF-g-SPS as the fluoropolymer with high ionic conductivity, this polymer is produced by grafting the styrene onto PVDF followed by sulfonation, the polymer blend is formed by mixing PVDF-g-SPS with the fluoro- or hydrocarbon-elastomer and PVDF resin has following merits:

(a) Excellent ionic conductivity ($\leqq 0.01$ S/cm) at room temperature.

(b) Excellent flexibility and stability; this membrane of compound material can be driven electrically and completely under the condition of 1V voltage and 0.5 Hz frequency.

(c) If required by practice, this membrane of compound material may further be cross-linked appropriately with organic diamine or organic peroxide for enhancing its mechanical strength that may reach 50~350 $kg/cm^2$, while its water uptake rate may reach 5~50%.

(d) Stable thermal stability; this membrane of compound material is extremely stable at the temperature below 200 degrees Celsius, and is started to decompose gradually from the temperature above 250 degrees Celsius, while the decomposing temperature for 50% analyzed by the TGA is 345 degrees Celsius.

(e) Stable chemical stability; there is no decomposition phenomenon for storing this membrane of compound material in the solution of the range of PH 1~14 for the long term, while heated at the boiling water also for the long term, its flexibility is still maintained at good condition without destruction.

(f) Excellent replacement of salt; when this membrane of compound material is applied in the macromolecular composite driven by electricity or fuel cell and the noble metal

TABLE 1

| No. | Components (gram) | Hydrogen Containment (gram) | Equivalent Weight (gram) | Membrane Thickness (μm) | Swing Test (5 V, 0.5 Hz) | Notation |
|---|---|---|---|---|---|---|
| 3 | PVDF-g-SPS (2.75) | $1.0250 \times 10^{-2}$ | — | 110 | Unable to swing | Easily broken, mechanical performance poor |
| 4 | PVDF (5.21) PVDF-g-SPS (1.47) | $5.4963 \times 10^{-3}$ | 1215 | 75 | Unable to swing | Hardness large, flexibility poor |
| 5 | PVDF (5.21) PVDF-g-SPS (1.47) Ethyl Acrylate (5.01) | $5.4963 \times 10^{-3}$ | 2127 | 140 | Good | Swinging time is longer than that of Nafion 117 |
| 6 | PVDF (9.38) PVDF-g-SPS (2.21) Ethyl Acrylate (7.52) | $8.2463 \times 10^{-3}$ | 2317 | 225 | Good | Swinging time is longer than that of Nafion 117 |
| 7 | PVDF (6.25) PVDF-g-SPS (2.75) Ethyl Acrylate (5.86) | $1.0250 \times 10^{-2}$ | 1449 | 220 | Swinging amplitude is too large. | — |

Note:
the test piece is 3 cm long and 0.3 cm wide.

is served as electrode material or catalyzer, since the salt replacement is good, so it is very important for manufacturing process.

(g) The obtained membrane not only has the merit of thick thickness of membrane and good function of driving performance, but also has characteristics of excellent mechanical performance, compact structure, long swinging time, superior flexibility, and long maintenance of good conductivity, etc.

(h) The cost of this product is much cheaper than that of the perfluorinated ionic polymer such as Nafion (Du Pont Co.) and it is also easy to be prepared.

While novel features of the present invention have been described with reference to one or more particular embodiments herein, those skilled in the art will recognize that many modifications and variations of the present invention are possible. Therefore, the scope of the present invention is to be limited only by the following claims.

What is claimed is:

1. A fluoropolymer blend with high ionic conductivity, applicable in an electroactive polymer composite, comprising:
    a styrene-grafted and sulfonated PVDF (PVDF-g-SPS);
    a poly[vinylidene] fluoride (PVDF); and
    a hydrocarbon-elastomer.

2. The fluoropolymer blend with high ionic conductivity according to claim 1, wherein said fluoropolymer blend is cross-linked by a cross-linking agent comprising a diamine compound or a peroxide compound ranging from 0.5% to 5% by weight, at a temperature ranging from 25-200 degree Celsius, and at a pressure ranging from 0~ to 500 psi.

3. The fluoropolymer blend with high ionic conductivity according to claim 1, wherein said PVDF has a number average molecular weight ranging from 80,000 to 350,000.

4. The fluoropolymer blend with high ionic conductivity according to claim 1, wherein said PVDF has a degree of grafting for the styrene monomer onto said PVDF ranging from 10% to 100% by weight, wherein the degree of grafting is defined by $[(m_1-m_0)/m_0] \times 100\%$, where in $m_0$ is the mass of PVDF and $m_1$ is the mass of grafted PVDF.

5. The fluoropolymer blend with high ionic conductivity according to claim 1, wherein said PVDF-g-SPS ranges from 10% to 60% by weight, said PVDF ranges from 15% to 50% by weight, and said hydrocarbon-elastomer ranges from 10% to 60% by weight.

6. The fluoropolymer blend with high ionic conductivity according to claim 1, wherein said hydrocarbon-elastomer is acrylic-elastomer ranges from 10% to 60% by weight.

7. A fluoropolymer blend with high ionic conductivity, applicable in an electroactive polymer composite, wherein said fluoropolymer blend consists essentially of a styrene-grafted and sulfonated PVDF (PVDF-g-SPS), a poly[vinylidene fluoride], (PVDF), and a hydrocarbon elastomer.

8. The fluoropolymer blend with high ionic conductivity according to claim 7, wherein said fluoropolymer blend is cross-linked by a cross-linking agent selected from the group consisting of a diamine compound or a peroxide compound ranging from 0.5% to 5% by weight, at a temperature ranging from 25-200 degree Celsius, and at a pressure ranging from 0~500 psi.

9. The fluoropolymer blend with high ionic conductivity according to claim 7, wherein said PVDF has a number average molecular weight ranging from 80,000 to 350,000.

10. The fluoropolymer blend with high ionic conductivity according to claim 7, wherein said PVDF has a degree of grafting for the styrene monomer onto said PVDF ranging from 10% to 100% by weight, wherein the degree of grafting is defined by $[(m_1-m_0)/m_0] \times 100\%$, where $m_0$ is the mass of PVDF and $m_1$ is the mass of grafted PVDF.

11. The fluoropolymer blend with high ionic conductivity according to claim 7, wherein said PVDF-g-SPS ranges from 10% to 60% by weight, said PVDF ranges from 15% to 50% by weight, and said hydrocarbon-elastomer ranges from 10% to 60% by weight.

12. The fluoropolymer blend with high ionic conductivity according to claim 7, wherein said fluoro-elastomer has a number average molecular weight ranging from 80,000 to 2,800,000.

13. The fluoropolymer blend with high ionic conductivity according to claim 7, wherein said fluoro-elastomer is a polymer of vinylidene fluoride/hexafluoropropylene/tetrafluoroethylene, ranging from 10% to 60% by weight.

* * * * *